(12) United States Patent
Loftin

(10) Patent No.: US 8,387,796 B2
(45) Date of Patent: Mar. 5, 2013

(54) BOX WITH IMPROVED RESEALABLE COVER

(76) Inventor: Russ Kirk Loftin, Costa Mesa, CA (US)

( * ) Notice: Subject to any disclaimer, the term of this patent is extended or adjusted under 35 U.S.C. 154(b) by 0 days.

(21) Appl. No.: 13/601,717

(22) Filed: Aug. 31, 2012

(65) Prior Publication Data

US 2012/0325817 A1  Dec. 27, 2012

Related U.S. Application Data

(62) Division of application No. 12/550,250, filed on Aug. 28, 2009, now Pat. No. 8,257,533.

(51) Int. Cl.
*B65D 85/00* (2006.01)
*B65D 41/00* (2006.01)

(52) U.S. Cl. .......... 206/459.5; 220/359.3; 220/377; 229/125.015; 428/34.7

(58) Field of Classification Search .......... 206/459.5; 220/359.1–359.4, 377; 229/125.015; 428/34.7, 428/34.9, 35.2, 35.7, 35.9, 40.1
See application file for complete search history.

(56) References Cited

U.S. PATENT DOCUMENTS

| | | | | |
|---|---|---|---|---|
| 5,962,092 A * | 10/1999 | Kuo et al. | | 428/34.9 |
| 6,003,670 A * | 12/1999 | Beer | | 206/459.5 |
| 6,273,986 B1 * | 8/2001 | Egan | | 428/40.1 |
| 7,323,235 B2 * | 1/2008 | Vaughn | | 428/40.1 |
| 7,579,061 B2 * | 8/2009 | Dronzek, Jr. | | 428/42.1 |
| 2008/0274315 A1 * | 11/2008 | Duquet et al. | | 428/35.2 |

* cited by examiner

*Primary Examiner* — Bryon Gehman
(74) *Attorney, Agent, or Firm* — Greenberg Traurig LLP; Franklin D. Ubell

(57) ABSTRACT

A box having a top surface and a resealable cover, the resealable cover comprising a top layer and a base layer. The top layer comprises a first clear film layer, an adhesive layer, and a second clear film layer disposed on a resealable adhesive layer. The base layer comprises a third clear film layer an adhesive layer, and a fourth clear film layer. In one embodiment, ink printing may be disposed between the first adhesive layer and the second clear film layer and/or between the second adhesive layer and the fourth clear film layer.

5 Claims, 6 Drawing Sheets

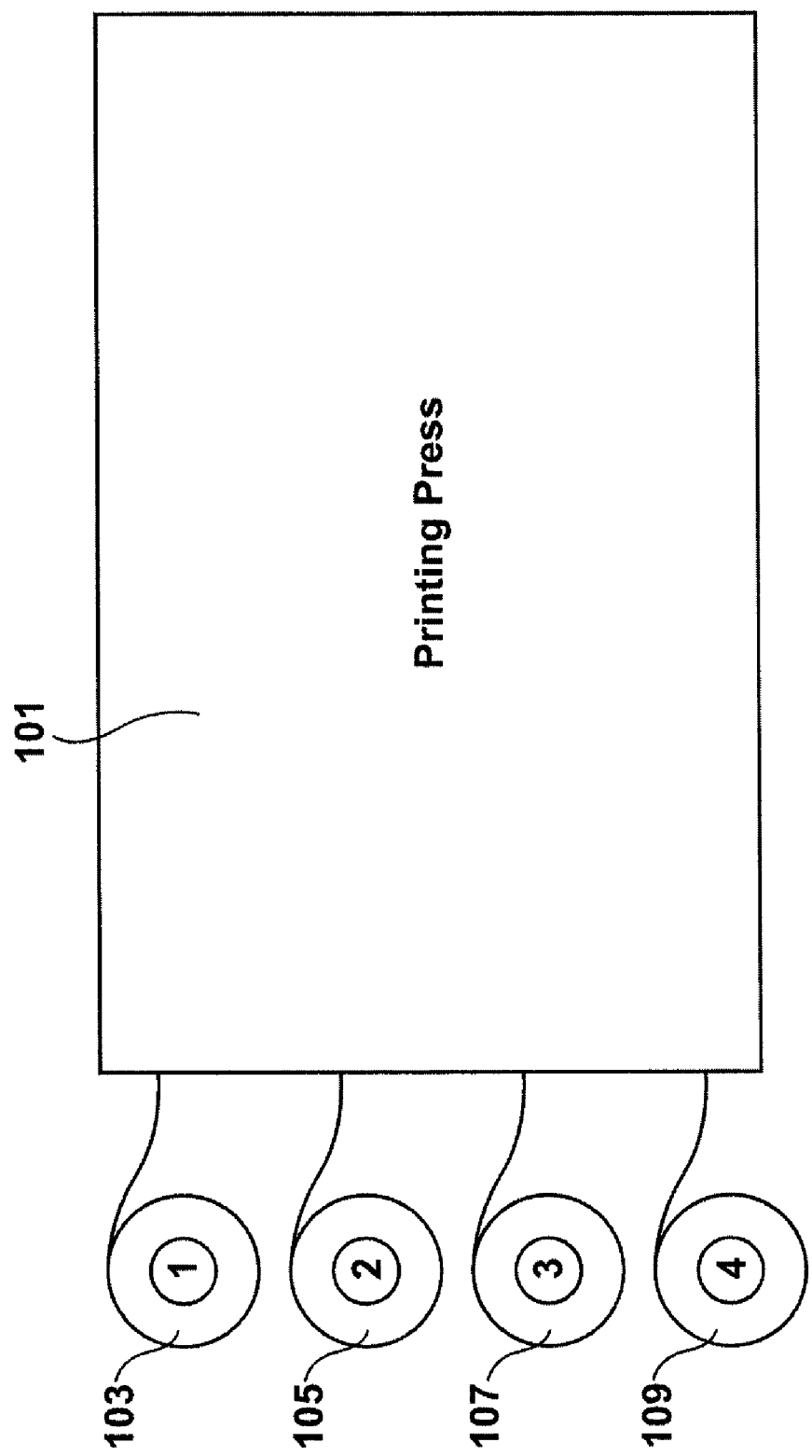

BOX WITH IMPROVED RESEALABLE COVER

CROSS REFERENCE TO RELATED APPLICATIONS

This application is a divisional of and claims priority to U.S. Utility patent application Ser. No. 12/550,250, entitled "Box With Improved Resealable Cover and Process of Making The Same," filed on Aug. 28, 2009, now U.S. Pat. No. 8,257,533 the contents of which is incorporated herein by reference in its entirety.

FIELD

The subject disclosure relates to containers and more particularly to a hollow container or box having a resealable cover or lid providing resealable access to the interior contents of the container.

RELATED ART

Containers of various shapes and sizes for various goods such as baked goods, body care items, and medical devices are known in the art.

SUMMARY

The present disclosure is directed to boxes or containers that have a resealable cover. In an illustrative embodiment, a box has a top surface and a resealable cover, the resealable cover comprising a top layer and a base layer. The top layer comprises a first clear film layer, an adhesive layer, and a second clear film layer disposed on a resealable adhesive layer. The base layer comprises a third clear film layer, an adhesive layer, and a fourth clear film layer. In one embodiment, ink printing may be disposed between the first adhesive layer and the second clear film layer and/or between the second adhesive layer and the fourth clear film layer.

In one embodiment, the base layer provides a rim and an opening into the box and the top layer comprises a cover resealably attachable about the rim and over the opening. An adhesive deadener may also be applied along an edge of the cover to create a tab which may be gripped to open the box. A process for making a resealable cover according to the illustrative embodiments is also disclosed.

BRIEF DESCRIPTION OF THE DRAWINGS

FIG. 6 is a schematic conceptual side view of illustrative apparatus for fabricating a resealable cover according to an illustrative embodiment.

DETAILED DESCRIPTION

Figure 1:
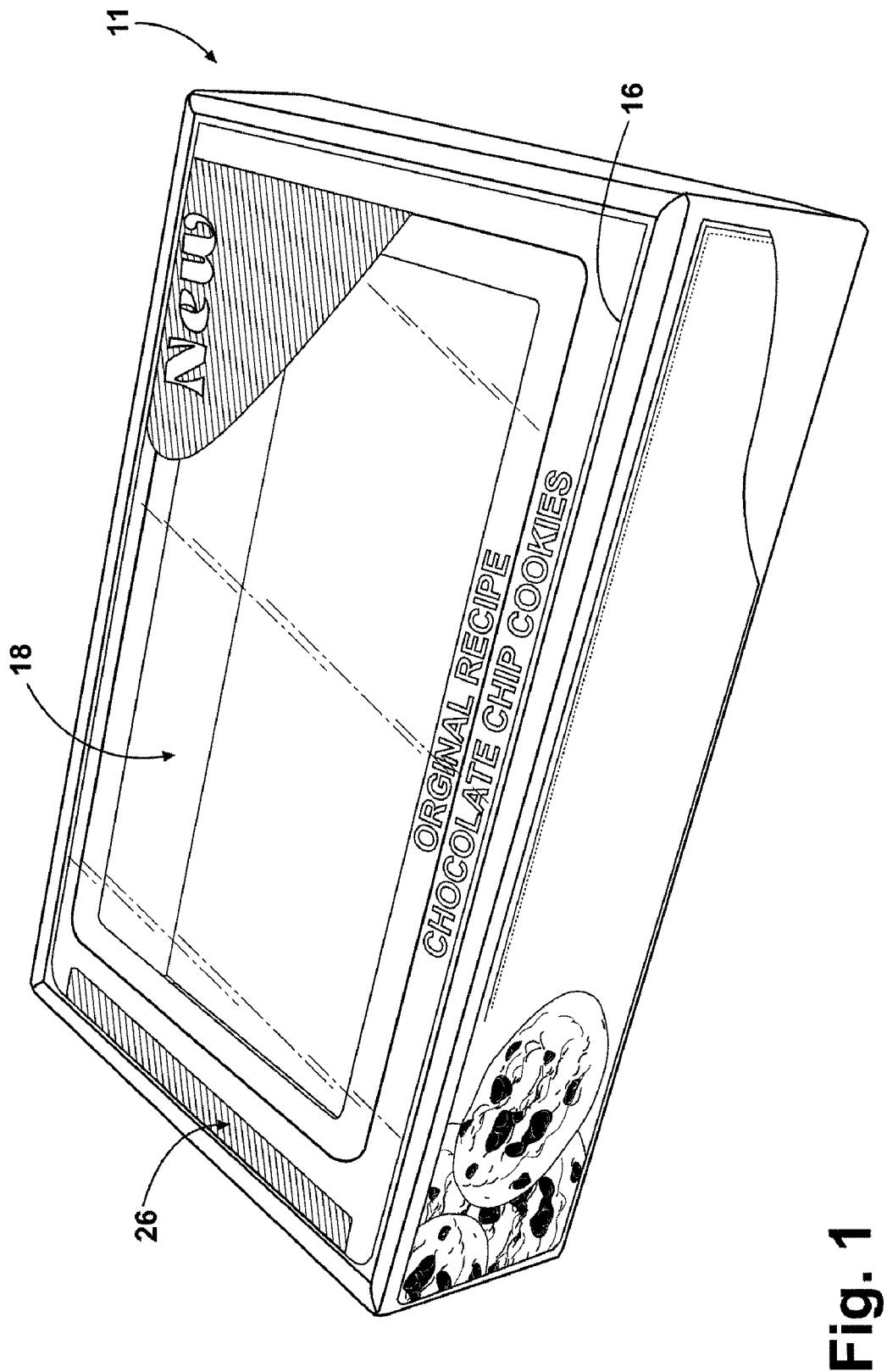
FIG. 1 is a perspective view of an illustrative container embodiment with a resealable cover in a closed position.
Figure 2:
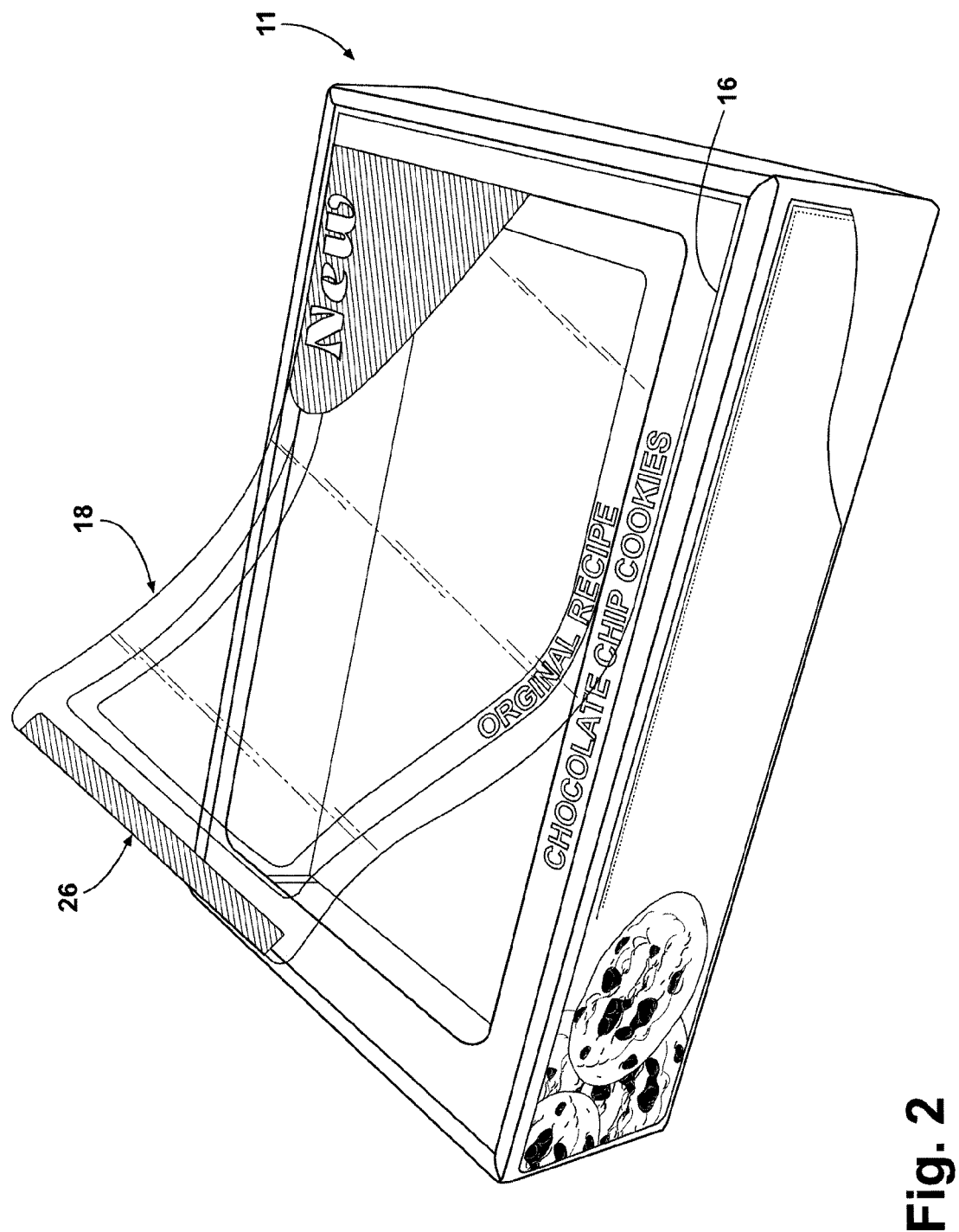
FIG. 2 is a perspective view of the container embodiment of FIG. 1 with the resealable cover in an open position.

FIGS. 1 and 2 depict an illustrative embodiment of a box 11 with a resealable cover. The box may have six sides formed of paperboard, cardboard, corrugated paperboard, chipboard or the like, or generally rigid plastic or other generally rigid material to provide a desired box shape and structure. A cover side may have a border portion 16 and a panel or cover 18 detachably secured to the border portion 16. The border portion 16 may be formed of a generally rigid material, for example, the same material as the sides of the box 11 or may be formed of a flexible material, for example, thin plastic material.

In the illustrative embodiment, the cover 18 may be formed of a layered flexible plastic sheet that may be transparent to allow viewing the contents of the box 11. A resealable adhesive is present on the underside edges of the layered sheet. The resealable adhesive tends to adhere to the border portion 16 and may be disengaged from the border portion 16 by a user pulling upwardly on the cover 18, for example, by a user grasping a tab 26 and pulling to lift the plastic cover 18. The box 11 may be resealed by placing the plastic cover edges on the border portion 16 and pressing on the areas having the resealable adhesive.

Figure 3:
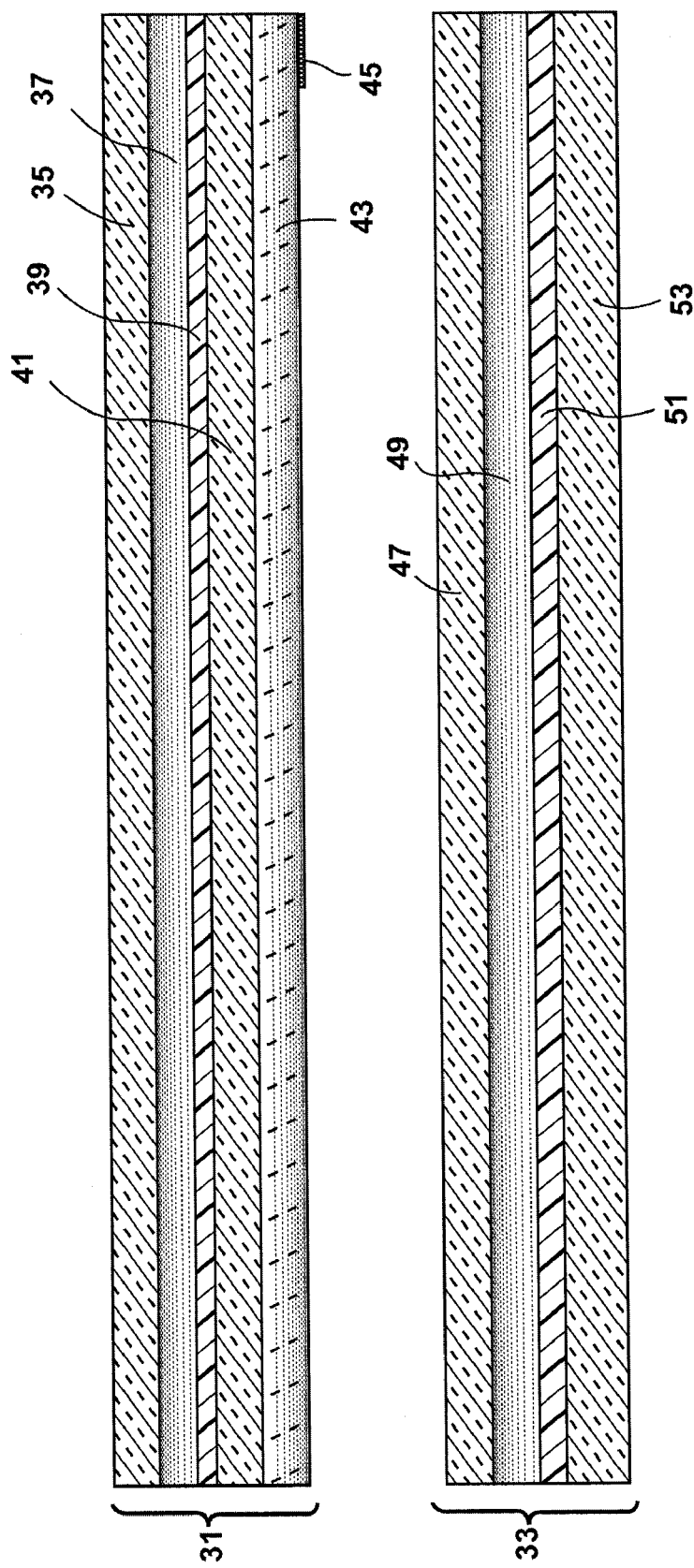
FIG. 3 is a side schematic view illustrating a resealable cover construction according to an illustrative embodiment.
Figure 4:
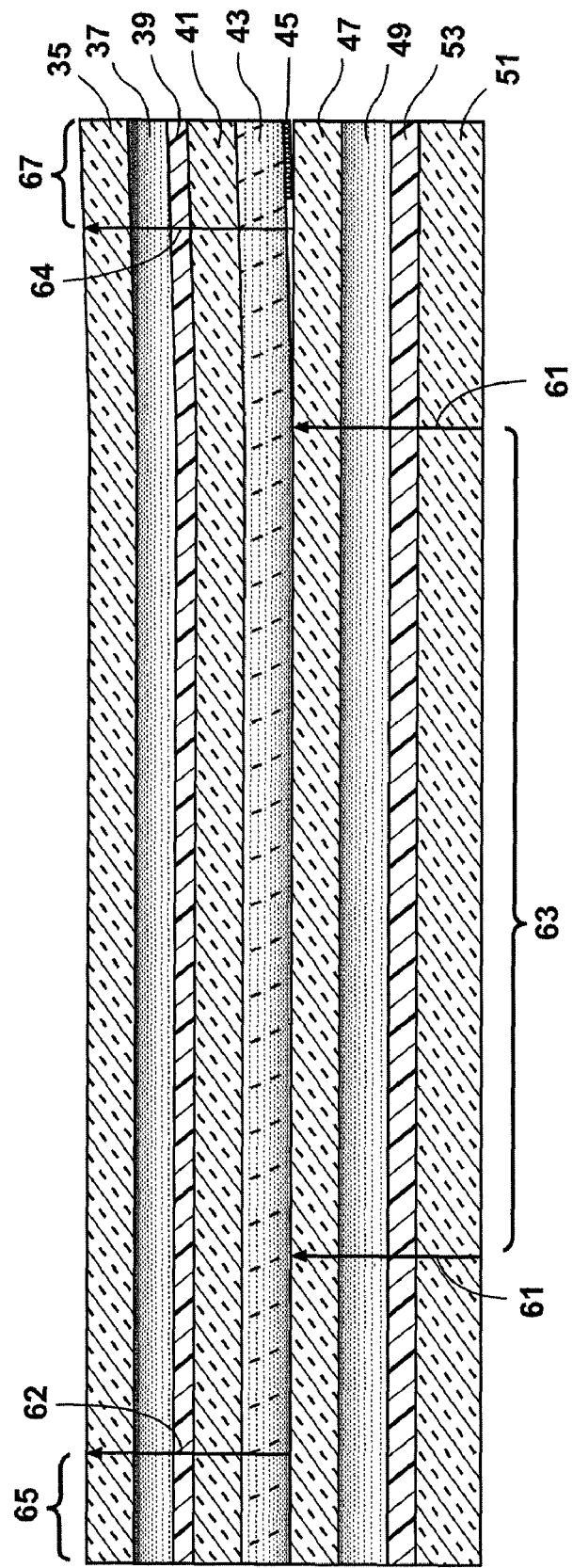
FIG. 4 is a side schematic view illustrating the resealable cover construction of FIG. 3 after merging all the structural layers.
Figure 5:
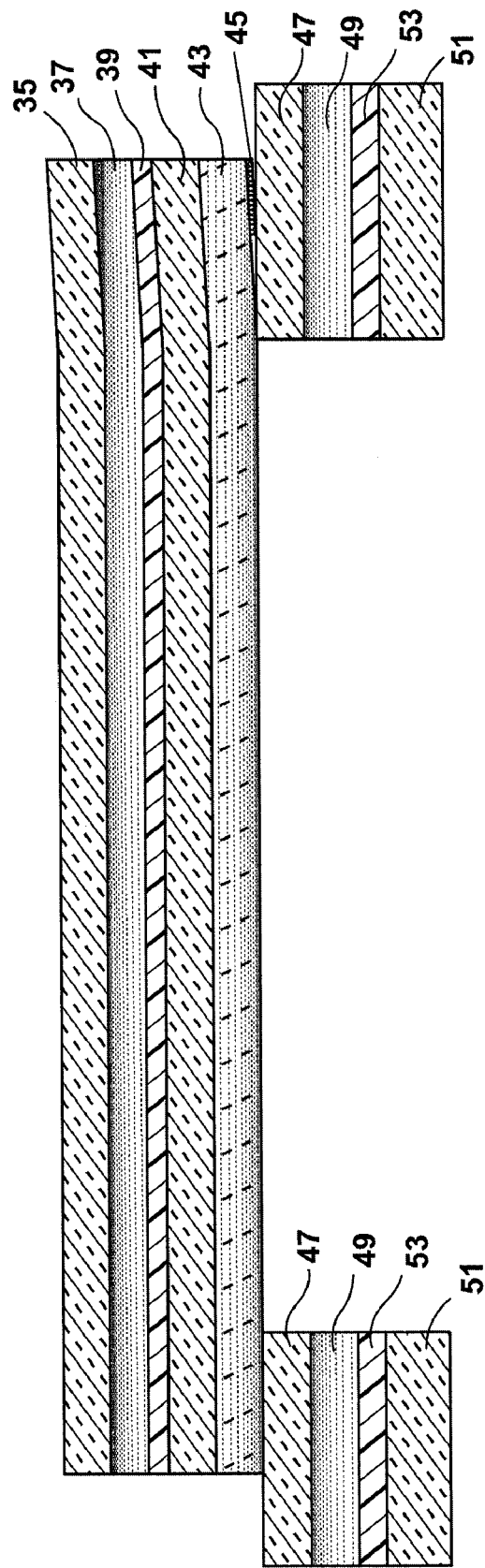
FIG. 5 is a side schematic view of the construction of FIG. 4 after die-cutting.

The particular manner of construction of an illustrative embodiment of the cover 18 and border 16 is illustrated in FIGS. 3-5. To create the cover 18 and border 16, a top layer 31 and base layer 33 are formed. The top layer 31 comprises a clear film layer 35, an adhesive layer 37, a first ink layer 39, a clear film layer 41, a resealable adhesive layer 43 and an adhesive deadener strip 45. The base layer 33 comprises a clear film layer 47, an adhesive layer 49, a second ink layer 51 and a clear film layer 53. The layers shown in FIGS. 3-5 are exaggerated in size for purposes of illustration. The actual layers are very thin on the order of mils.

With respect to the illustrative example of FIGS. 1 and 2 the script "ORIGINAL RECIPE" is created in the first ink layer 39, while the script "CHOCOLATE CHIP" is created in the second layer 51. The adhesive deadener strip 45 creates the tab 26.

The cover 18 and border 16 may be fabricated using a printing press 101 shown very generally in FIG. 6, for example, a press known in the art as a "Flexo Press." In one embodiment, four different rolls of film 103, 105, 107, 109 are fed into the press at the same time. In one embodiment, the first roll is the base material consisting of the clear film 47 with adhesive 49. A second roll comprising clear film 51 is fed into the press 101 and color(s), i.e., ink layer 53, are printed with printing plates on the clear film 51. The clear film adhesive 47/49 is then married or joined to the ink imprinted clear film layer 51 to create the base layer 33. The adhesive deadener strip 45 is printed on the releasable adhesive layer 43 at an appropriate point during the printing process.

As the base layer 33 continues traveling through the press, the third roll consisting of the clear film layer 41 on top of the resealable adhesive layer 43 is married onto the base layer 33 to create the beginning of the top layer 31. Then more colors, i.e. ink layer 39, are printed using printing plates. Finally, the last roll comprising the layer of clear film 35 and adhesive layer 37 are laminated on top of or otherwise joined together with the printed ink layer 39.

The four married layers of clear film and accompanying ink then travel into die cutting stations to cut the shapes that lead to a finished product that can be applied to boxes or containers. One manner of cutting according to an illustrative embodiment is shown in FIG. 4. A first "kiss cut" along arrows 61 is made through the base layer 33, and a second "kiss cut" is made on lines 62 and 64 through the top layer 33. The first kiss cut removes the four layers in the region 63 to create the opening-into the box or container. The second kiss cut along lines 62, 64 removes the edges 65, 67 of the top layer, creating the resealable cover. The structure after die cutting is illustrated in FIG. 5.

While the illustrative embodiment is directed to a resealable cover for a generally rectangular box shape, other container shapes may also be used. Examples of container shapes include cylindrical, triangular, hexagonal or other irregular forms. The shape of the resealable cover and container opening may also of course vary to be square, rectangular, circular, oval or irregular shapes. The container may be adapted to hold and store various items such as baked goods, body care items, medical devices and other items. Various other presses also could be used to produce or fabricate the cover 18 and border 16, for example, such as a rotogravure or the like.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A container or package having a resealable cover, the resealable cover comprising:

a first clear film with a first adhesive layer thereon;

a second clear film layer having ink printed thereon;

the first clear film layer and first adhesive layer being attached to the ink-printed second clear film layer;

a third clear film layer on top of a resealable second adhesive layer, the resealable second adhesive layer being attached to the first clear film layer, the third clear film layer having ink printed thereon;

a fourth clear film on top of a third adhesive layer; and a third adhesive layer being attached to the ink-printed third clear film layer, and a fourth clear film on top of the third adhesive layer.

2. The container or package of claim 1 further comprising an opening cut through said first and second clear film layers.

3. The container or package of claim 2 further comprising an adhesive deadener added to a portion of said resealable adhesive layer.

4. The container or package of claim 1 further comprising an adhesive deadener added to a portion of said resealable second adhesive layer.

5. The container or package of claim 1 wherein the container is a box.

* * * * *